UNITED STATES PATENT OFFICE 2,392,158

OIL SOLUBLE DYES

Harold Talbot Lacey, Plainfield, and Walter Eldon Ness, Middlesex Borough, N. J., assignors to American Cyanamid Company, New York, N. Y., a corporation of Maine No Drawing. Application January 9, 1943,
Serial No. 471,916

10 Claims. (Cl. 260—169)

This invention relates to dyestuffs containing acid groups, but soluble or dispersible in water immiscible organic solvents.

The large class of dyestuffs having acid groups such as sulfonic and carboxylic groups have been used extensively in the dyeing of basic nitrogenous fibers and in the case of the direct dyes also for the dyeing of cellulosic fibers. They are, however, in general not soluble or dispersible in water immiscible organic solvents such as hydrocarbons, glyceride oils and the like, and, therefore, this class of dyestuffs has not been generally used in fields which require the dispersion or solution of the dyestuff in water immiscible solvents.

According to the present invention, dyestuffs containing acid groups are reacted with certain esterified condensation products of alkylene oxides or chlorhydrin and trialkylolamines. The resulting products, which are probably salts or similar compounds, are soluble or dispersible in water immiscible solvents. The trialkylolamine is condensed with at least 5 equivalents of alkylene oxide or chlorhydrin and the condensation product is esterified with 3 equivalents of an aliphatic acid having a sufficiently long hydrocarbon chain. The condensation products correspond to the formula:

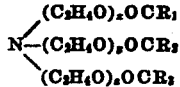

$R_1$, $R_2$, and $R_3$ being residues of the same or different fatty acids, these radicals being aliphatic hydrocarbon radicals with at least eleven carbon atoms, and $x$, $y$, and $z$ being integers their sum being at least eight. The present invention is applicable in general to all dyestuffs having acid groups, and since the products are soluble or dispersible in water immiscible solvents it broadens the field of usefulness for dyes having these acid groups.

The present invention is concerned only with the reaction products of the esterified condensation products with the dyes themselves and is not intended to cover the new esterified condensation products of alkylolamines and alkylene oxides, these forming the subject matter of our copending application, Serial No. 468,548, filed December 10, 1942. While the number of alkylene oxide molecules condensed with the trialkylolamine is not critical so long as there are at least 5, in general the products are more satisfactory if the number of alkylene oxide groups is at least 5 and not more than 15, and the dyes when reacted with these products constitute the preferred group in the present invention.

It is an advantage of the present invention that the process of reacting the esterified condensation products with the dyes is not difficult and that yields are excellent, in many cases being substantially quantitative. In general the reaction is best if it takes place between either the free base and the free acid dyestuff or the salt of the base with a strong acid such as hydrochloric acid and the alkali metal salts of the dyestuff. In either case the reaction takes place readily with moderate heating and presents no particular control problems. The products obtained are stable and are suitable for various uses such as process printing, coloring of plastics, oils, gasoline and the like. Transparent products are obtainable when the dyes are suitably dispersed in the medium.

The present invention will be illustrated in conjunction with the following specific examples. The parts are by weight.

Example 1

149 parts of triethanolamine are placed in a vessel fitted with a brine-cooled reflux condenser, a sealed agitator and an inlet tube having a manifold with fine perforations under the surface of the triethanolamine. The charge is stirred rapidly, heated to 100–110° C. and 220 parts of ethylene oxide are bubbled in through the inlet tube. Before introducing the ethylene oxide a trace of sodium or potassium hydroxide is added. The introduction of ethylene oxide is preferably maintained at a rate so that the major portion is absorbed. Any small amount escaping is condensed by the reflux condenser and returned to the reaction mixture. After all of the ethylene oxide has been absorbed the mixture appears substantially homogeneous and the yield is practically quantitative.

Example 2

149 parts of triethanolamine are placed in a vessel fitted with a brine-cooled reflux condenser, a sealed agitator and an inlet tube having a manifold with fine perforations under the surface of the triethanolamine. The charge is stirred rapidly, heated to 100–110° C. and 440 parts of ethylene oxide are bubbled in through the inlet tube. Before introducing the ethylene oxide a trace of sodium or potassium hydroxide is added. The introduction of ethylene oxide is preferably maintained at a rate so that the major portion is absorbed. Any small amount escaping is condensed by the reflux condenser and returned to the reaction mixture. After all of the ethylene oxide has been absorbed the mixture appears substantially homogeneous and the yield is practically quantitative.

*Example 3*

149 parts of triethanolamine are placed in a vessel fitted with a brine-cooled reflux condenser, a sealed agitator and an inlet tube having a manifold with fine perforations under the surface of the triethanolamine. The charge is stirred rapidly, heated to 100–110° C. and 660 parts of ethylene oxide are bubbled in through the inlet tube. Before introducing the ethylene oxide a trace of sodium or potassium hydroxide is added. The introduction of ethylene oxide is preferably maintained at a rate so that the major portion is absorbed. Any small amount escaping is condensed by the reflux condenser and returned to the reaction mixture. After all of the ethylene oxide has been absorbed the mixture appears substantially homogeneous and the yield is practically quantitative.

*Example 4*

191 parts of tri-isopropanolamine are placed in a vessel fitted with a brine-cooled reflux condenser, a sealed agitator and an inlet tube having a manifold with fine perforations under the surface of the tri-isopropanolamine. The charge is rapidly stirred, heated to 100–110° C. and 290 parts of propylene oxide are vaporized and the vapors bubbled in through the inlet tube. Before introducing the propylene oxide a trace of sodium or potassium hydroxide is added to the reaction mixture. After all of the propylene oxide has been absorbed the mixture becomes substantially homogeneous and an almost quantitative yield is obtained.

*Example 5*

191 parts of tri-isopropanolamine are placed in a vessel fitted with a brine-cooled reflux condenser, a sealed agitator and an inlet tube having a manifold with fine perforations under the surface of the tri-isopropanolamine. The charge is rapidly stirred, heated to 100–110° C. and 580 parts of propylene oxide are vaporized and the vapors bubbled in through the inlet tube. Before introducing the propylene oxide a trace of sodium or potassium hydroxide is added to the reaction mixture. After all of the propylene oxide has been absorbed the mixture becomes substantially homogeneous and an almost quantitative yield is obtained.

*Example 6*

149 parts of triethanolamine are placed in a vessel fitted with a brine-cooled reflux condenser, a sealed agitator and an inlet tube having a manifold with fine perforations under the surface of the triethanolamine. The charge is rapidly stirred, heated to 100–110° C. and 290 parts of propylene oxide are vaporized and the vapors bubbled in through the inlet tube. Before introducing the propylene oxide a trace of sodium or potassium hydroxide is added to the reaction mixture. After all of the propylene oxide has been absorbed the mixture becomes substantially homogeneous and an almost quantitative yield is obtained.

*Example 7*

191 parts of tri-isopropanolamine are placed in a vessel fitted with a brine-cooled reflux condenser, a sealed agitator and an inlet tube having a manifold with fine perforations under the surface of the tri-isopropanolamine. The charge is rapidly stirred, heated to 100–110° C. and 220 parts of ethylene oxide are bubbled in through the inlet tube. Before introducing the ethylene oxide a trace of sodium or potassium hydroxide is added to the reaction mixture. After all of the ethylene oxide has been absorbed the mixture becomes substantially homogeneous and an almost quantitative yield is obtained.

*Example 8*

The condensation product produced according to any one of the seven preceding examples is heated with 3 moles of oleic acid in an open vat for a number of hours at 140–170° C. The heating is continued until reaction is complete, which is substantially quantitative.

*Example 9*

The condensation product produced according to any one of Examples 1–7 is heated with 3 moles of stearic acid in an open vat for a number of hours at 140–170° C. The heating is continued until reaction is complete, which is substantially quantitative.

*Example 10*

The condensation product produced according to any one of Examples 1–7 is heated with 3 moles of soya bean acid in an open vat for a number of hours at 140–170° C. The heating is continued until reaction is complete, which is substantially quantitative.

*Example 11*

The condensation product produced according to any one of examples 1–7 is heated with 3 moles of lauric acid in an open vat for a number of hours at 140–170° C. The heating is continued until reaction is complete, which is substantially quantitative.

*Example 12*

The product of any of Examples 8–11 is treated with 1 mole of hydrochloric acid (20° Bé. solution), the mixture taking place with vigorous agitation at room temperature. The products are converted into the hydrochloride substantially quantitatively.

*Example 13*

The product according to Example 1 is mixed with 133 parts of 20° Bé. hydrochloric acid and esterified with 888 parts of oleic acid by heating at 170° C. until reaction is complete. The hydrochloride of the ester is produced and is the same as obtained in the preceding example.

In a similar manner the products of Examples 2 and 3 may be esterified in the presence of the corresponding amount of hydrochloric acid, using either oleic acid or any of the other acids described in Examples 5–7.

*Example 14*

A product according to Example 13 is placed in a reaction vessel provided with stirring and heating means and 0.3 molecular equivalent of Naphthol Green B (ferric complex CI 5) is slowly added with vigorous stirring and the reaction mixture is heated up to 70° C. and maintained at this temperature until reaction is complete. The product is a green dye which is soluble in water immiscible organic solvents such as benzene, toluene, solvent naphtha, mixed hexanes, gasoline, kerosene, lubricating oil, drying oils and the like.

Example 15

One mole of any of the esterified products of Example 12 is placed in a reaction vessel provided with agitation and heating, and 0.9 mole of Patent Blue A (CI 714) is slowly added, the reaction mixture being heated with stirring to 70° C. and maintained at this temperature until reaction is complete. The product is a blue which is soluble in water immisible organic solvents such as benzene, toluene, solvent naphtha, mixed hexanes, gasoline, kerosene, lubricating oil, drying oils and the like.

Example 16

The procedure of Example 15 is followed but instead of the Patent Blue 0.5 mole of Direct Black E (CI 581) is substituted. A black color is produced which is soluble in water immiscible organic solvents such as benzene, toluene, solvent naphtha, mixed hexanes, gasoline, kerosene, lubricating oil, drying oils and the like.

Example 17

One mole of a free ester prepared according to any of Examples 8–11 is heated at 70° C. with 0.9 mole of free acid of Patent Blue until reaction is complete. The product obtained is substantially identical with that of Example 15.

Example 18

One mole of any of the esterified products of Example 12 is placed in a reaction vessel provided with agitation and heating and 0.45 mole of Erioglaucine A (CI 671) is slowly added, the reaction mixture being heated with stirring to 70° C. and maintained at this temperature until reaction is complete. The product is a greenish-blue which is soluble in water immiscible organic solvents such as benzene, toluene, solvent naphtha, mixed hexanes, gasoline, kerosene, lubricating oil, drying oils and the like.

Example 19

One mole of any of the esterified products of Example 12 is placed in a reaction vessel provided with agitation and heating, and 0.6 mole of Nigrosine WS (CI 865) is slowly added, assuming that Nigrosine has a molecular weight of 400 and that the mixture averages 1.5 sulfonic acid groups per molecule of dye, the reaction mixture being heated with stirring to 70° C. and maintained at this temperature until reaction is complete. The product is a black which is soluble in water immiscible organic solvents such as benzene, toluene, solvent naphtha, mixed hexanes, gasoline, kerosene, lubricating oil, drying oils and the like.

Example 20

One mole of any of the esterified products of Example 12 is placed in a reaction vessel provided with agitation and heating, and 0.45 mole of Alizarine Cyanine Green (CI 1078) is slowly added, the reaction mixture being heated with stirring to 70° C. and maintained at this temperature until reaction is complete. The product is a green which is soluble in water immiscible organic solvents such as benzene, toluene, solvent naphtha, mixed hexanes, gasoline, kerosene, lubricating oil, drying oils and the like.

Other water-soluble dyestuffs containing acid groups in addition to those in the above examples may also be converted to organophillic dyestuffs by the same procedure. For example: anthraquinone acid dyes such as Alizarine Rubinol G—C. I. 1091, Alizarine Direct Blue B—C. I. 1087, and Alizarine Sapphire Blue B—C. I. 1054; thiazole dyestuffs such as Direct Fast Yellow B—C. I. 814; nitro dyestuffs such as Naphthol Yellow S—C. I. 10; mono-azo dyestuffs such as Fast Light Orange 2G—C, I. 27, Croceine Orange—C. I. 26, Acid Brilliant Red R—C. I. 32, Lake Scarlet 2R—C. I. 79, Bordeaux B—C. I. 88, Fast Red A—C. I. 176, dis-azo dyestuffs such as Naphthylamine Blue R—C, I, 289; stilbene dyestuffs such as Stilbene Yellow 2G—C. I. 620 and Stilbene Orange R—C. I. 621; pyrazolone dyestuffs such as Tartrazine—C. I. 640; triphenylmethane dyestuffs such as Acid Light Green SF—C. I. 670, Soluble Blue R—C. I. 705, and Soluble Blue 3R—C. I. 706.

The presence of a large number of polar groups in the dye molecule such as Alizarine Sapphire Blue B, C. I. 1054, decreases the solubility of the resulting product in organic, water-immiscible solvents.

We claim:

1. A dyestuff dispersible in water immiscible organic solvents comprising the reaction product of a dyestuff having sulfonic acid groups with an ester of a condensation product of ethylene oxide and triethanolamine having the following formula:

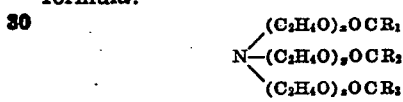

in which $R_1$, $R_2$ and $R_3$ are aliphatic hydrocarbon radicals having at least eleven carbon atoms, and $x$, $y$ and $z$ are integers and their sum is not less than 8.

2. A dyestuff dispersible in water immiscible organic solvents comprising the reaction product of a dyestuff having sulfonic acid groups with an ester of a condensation product of ethylene oxide and triethanolamine having the following formula:

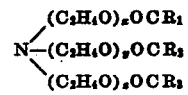

in which $R_1$, $R_2$ and $R_3$ are aliphatic hydrocarbon radicals having at least eleven carbon atoms and the sum of $x$, $y$ and $z$ equals 8.

3. A dyestuff dispersible in water immiscible organic solvents comprising the reaction product of a dyestuff having sulfonic acid groups with an ester of a condensation product having the following formula:

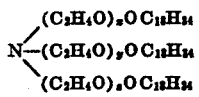

in which $x$, $y$ and $z$ are integers and their sum is not less than 8.

4. A dyestuff according to claim 3 in which the sum of $x$, $y$ and $z$ equals 8.

5. A dyestuff dispersible in water immiscible organic solvents comprising the reaction product Naphthol Green B with a triester of a condensation product having the following formula:

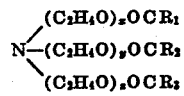

in which $R_1$, $R_2$ and $R_3$ are aliphatic hydrocarbon radicals of at least 11 carbon atoms, and $x$, $y$ and $z$ are integers and their sum is not less than 8.

6. A dyestuff according to claim 5 in which the sum of $x$, $y$ and $z$ equals 8.

7. A dyestuff dispersible in water immiscible organic solvents comprising the reaction product of Patent Blue A with a triester of a condensation product having the following formula:

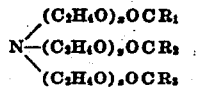

in which $R_1$, $R_2$ and $R_3$ are aliphatic hydrocarbon radicals of at least 11 carbon atoms, and $x$, $y$ and $z$ are integers and their sum is not less than 8.

8. A dyestuff according to claim 7 in which the sum of $x$, $y$ and $z$ equals 8.

9. A dyestuff dispersible in water immiscible organic solvents comprising the reaction product of Direct Black E with a triester of a condensation product having the following formula:

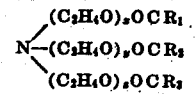

in which $R_1$, $R_2$ and $R_3$ are aliphatic hydrocarbon radicals of at least 11 carbon atoms, and $x$, $y$ and $z$ are integers and their sum is not less than 8.

10. A dyestuff according to claim 9 in which the sum of $x$, $y$ and $z$ equals 8.

HAROLD TALBOT LACEY.
WALTER ELDON NESS.